(12) United States Patent
Bold

(10) Patent No.: US 7,988,093 B2
(45) Date of Patent: Aug. 2, 2011

(54) WINDOW FRAME FOR AIRCRAFT

(75) Inventor: Jens Bold, Hamburg (DE)

(73) Assignee: Airbus Deutschland GmbH (DE)

( * ) Notice: Subject to any disclaimer, the term of this patent is extended or adjusted under 35 U.S.C. 154(b) by 227 days.

(21) Appl. No.: 11/596,627

(22) PCT Filed: May 24, 2005

(86) PCT No.: PCT/EP2005/005602
§ 371 (c)(1),
(2), (4) Date: Nov. 15, 2006

(87) PCT Pub. No.: WO2005/115836
PCT Pub. Date: Dec. 8, 2005

(65) Prior Publication Data
US 2008/0078878 A1 Apr. 3, 2008

Related U.S. Application Data

(60) Provisional application No. 60/600,112, filed on Aug. 9, 2004.

(30) Foreign Application Priority Data

May 24, 2004 (DE) .................... 10 2004 025 377

(51) Int. Cl.
*B64C 1/14* (2006.01)
(52) U.S. Cl. ................................... 244/129.3
(58) Field of Classification Search ............ 244/129.3, 244/129.1, 121, 131; 52/171.1, 204.1, 204.5
See application file for complete search history.

(56) References Cited

U.S. PATENT DOCUMENTS

| 5,024,399 A | 6/1991 | Barquet et al. |
| 5,945,356 A * | 8/1999 | Pott ................................ 442/57 |
| 6,585,842 B1 * | 7/2003 | Bompard et al. ............. 156/166 |
| 2003/0168775 A1 * | 9/2003 | Eberth et al. .................. 264/258 |

FOREIGN PATENT DOCUMENTS

| DE | 689 04 601 T2 | 6/1989 |
| DE | 102 51 579 A1 | 9/2003 |
| DE | 102 51 580 | 9/2003 |
| EP | 0 089 337 B1 | 9/1983 |
| EP | 1 342 553 A1 | 9/2003 |
| WO | WO-83/01237 A1 | 4/1983 |
| WO | WO 02098651 A1 * | 12/2002 |
| WO | WO-03/103933 | 12/2003 |
| WO | WO-2004/016844 A1 | 2/2004 |

* cited by examiner

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

A window frame (1) for installation in the exterior (5) of an aircraft, which comprises in each case at least one outer flange (2), one inner flange, and one vertical flange (4) arranged perpendicular between these flanges, is manufactured from a fiber-reinforced synthetic resin, in which, first, a semifinished part comprising fiber material is inserted into a molding tool, in which, under pressure and temperature, resin is injected, and subsequently, the component made in this manner is hardened in the molding tool. The semifinished part can have a layer structure either made from a webbing material, from fiber bundles, or from a combination of fiber bundles and a webbing material.

3 Claims, 4 Drawing Sheets

WINDOW FRAME FOR AIRCRAFT

This application claims the benefit of the filing date of U.S. Provisional Patent Application No. [60/600,112] filed Aug. 9, 2004 and of the German Patent Application No. 10 2004 025 377.3 filed May 24, 2004, the disclosure of which is hereby incorporated herein by reference.

The invention relates to a window frame for installation in the exterior shell of an aircraft, comprising in each case at least one outer flange, one inner flange, and one vertical flange arranged perpendicular to and between these flanges, wherein the connection with the aircraft structure takes place via the outer flange, and wherein on the inner flange, a window element to be held is attached, which is held via the vertical flange. Further, the invention relates to a method for manufacturing such a window frame.

In most of the aircraft manufactured and in operation today, window frames made of aluminum are used, which comprise a part which is made by forging and truing. The component is organized into a total of three regions: an outer flange, an inner flange, and a vertical flange arranged perpendicular to and between these two flanges. The window frames are typically connected with two rows of rivets via the outer flange with the aircraft structure or with the exterior shell of the aircraft. A window element rests on the inner flange, which, in turn, usually comprises two panes and a sealing arranged therebetween and which is held in its position via a downholder, which is connected with the vertical flange.

In addition to fixing the window element, such a window frame also has the function of absorbing the strain increase, which occurs on the edge of the comparably large cut-out for the window mounted in the load-transferring exterior shell. The outer flange of the window frame thereby serves, on the one hand, for reinforcement of this cut-out and on the other hand, via the outer flange, the frame and the exterior shell are connected to one another by means of rivets. Since the manufacture of the known aluminum window frame typically takes place by means of forging, it is not possible to achieve a cross-sectional distribution of the frame profile that is favorable for the rivet force distribution, since the slant of the flange may amount to a maximum of approximately two angular degrees, in order to enable a simple riveting.

The inner flange serves to receive the window element, wherein here a slanting of the mounting of the window is simplified. Simultaneously, the existing load from the interior pressure, which prevails in the passenger cabin, is transferred via this inner flange to the exterior shell of the aircraft.

The vertical flange serves exclusively as a reinforcement rib on the frame, in order to minimize the tension in the exterior shell with the least possible weight. On this vertical flange, also the eye bolts are attached, with which, typically, the downholder or retainer for the window elements are held in their position. Simultaneously, the vertical flange also forms the guide upon mounting of the window element.

An object of the invention is to provide a window frame of the above-described type, which makes possible a considerable weight savings compared to the window frames used today for this application. Simultaneously, the costs for the manufacture of such a window frame should be as low as possible. In addition, by means of the present invention, the simplest and most cost-effectively performed method for making such a window frame should be provided.

The invention solves the first object, in that it contemplates that such a window frame comprises a fiber-reinforced resin. The solution of the further object is realized by means of a method, in which a semifinished part made from a fiber material is inserted into a molding tool, in which resin is injected under pressure and temperature, and with which the component developed in this manner is subsequently hardened in the molding tool.

The invention makes possible the use of a window frame, which is made in fiber-composition construction, whereby, compared to the aluminum window frames used up to now, a weight savings of up to 50 percent is achieved. In spite of this great weight savings potential, the costs for such a component, compared to a window frame made from an aluminum forged part, do not rise.

Simultaneously, it is possible to manufacture the fiber window frame according to the present invention with a tolerance of only approximately 0.2 mm with an average wall thickness of 5 mm, which corresponds to a manufacturing tolerance of approximately 4 percent. With aluminum forged frames, in contrast, depending on the manufacturing method, tolerances of approximately 1.5 mm are accepted, which corresponds to a manufacturing tolerance of approximately 30 percent with the same will thickness. Therefore, by means of the present invention, not only the weight fluctuations between the individual window frames are substantially reduced, but also, simultaneously, the installation of the frame in an aircraft or the mounting of the window element in the frame is simplified considerably. Finally, further advantages are increased safety as well as a greatly improved thermal insulation of the window frame according to the invention.

Next, the invention will be described in greater detail with reference to an embodiment shown in the accompanying figures. In the figures:

FIGS. 5 and 6 show a representation of the main directions with a window frame of FIG. 1, wherein FIG. 6 is a detail representation of the region in FIG. 5 designated with VI;

Figure 1:
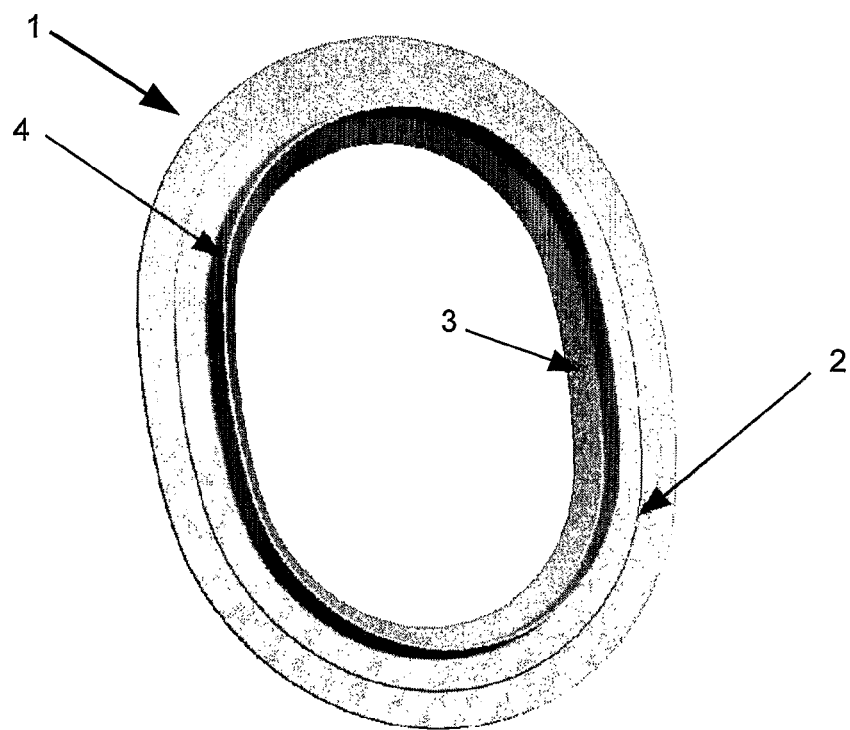
FIG. 1 shows a window frame in perspective view.
Figure 2:
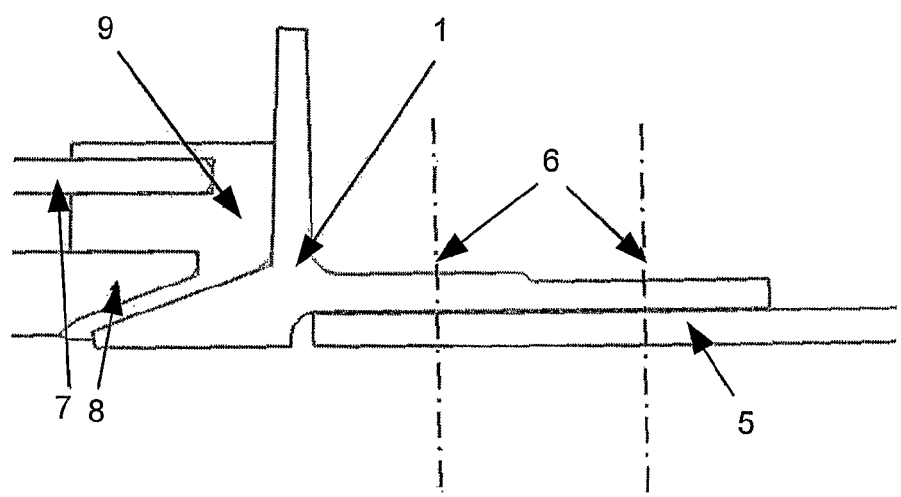
FIG. 2 shows a detail section through the installation position of a window frame according to FIG. 1.

The window frame 1 shown in FIG. 1 is made with a fiber construction and, like the known aluminum forged frames, also has an outer flange 2, an inner flange 3, as well as a vertical flange 4 arranged between these two flanges. In contrast to conventional aluminum window frames, the outer flange 2 in this case, however, has a uniform circumferential edge. Further, this outer flange 2, in contrast to a corresponding aluminum forged part has a varying thickness in different radial regions. This leads to a substantially improved material utilization in the region of the riveting and the shell cut-out. FIG. 2 more clearly shows this in a detail section, in which the installation position of such a window frame 1 in the outer shell 5 of an aircraft is shown. Indicated in this figure are also the rivet positions 6 for the connection of the frame with the outer shell 5, as well as two window panes 7 and 8, which together with a sealing 9, form the window element.

Figure 3:
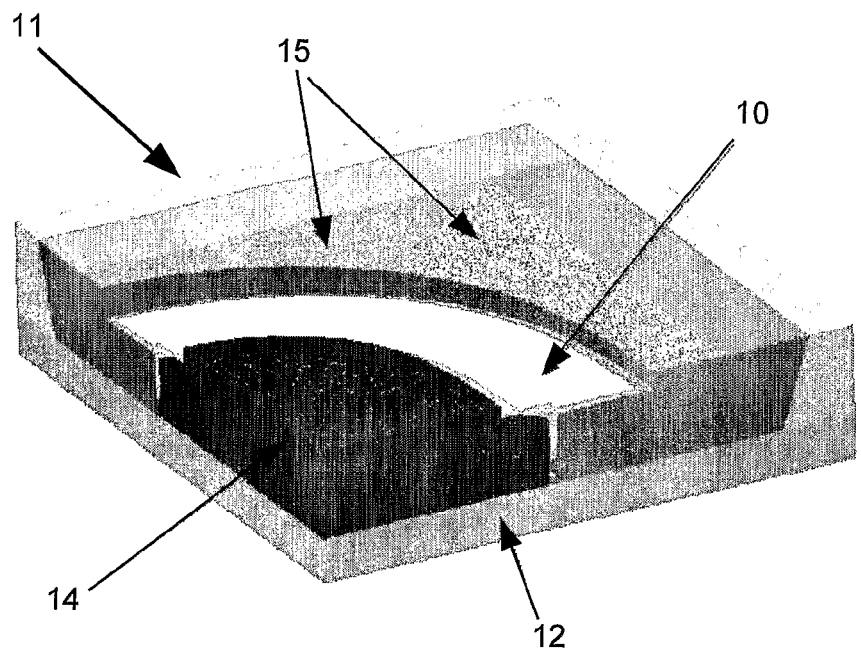
FIG. 3 shows a part of a molding tool for making a window frame of FIG. 1 in an opened position.
Figure 4:
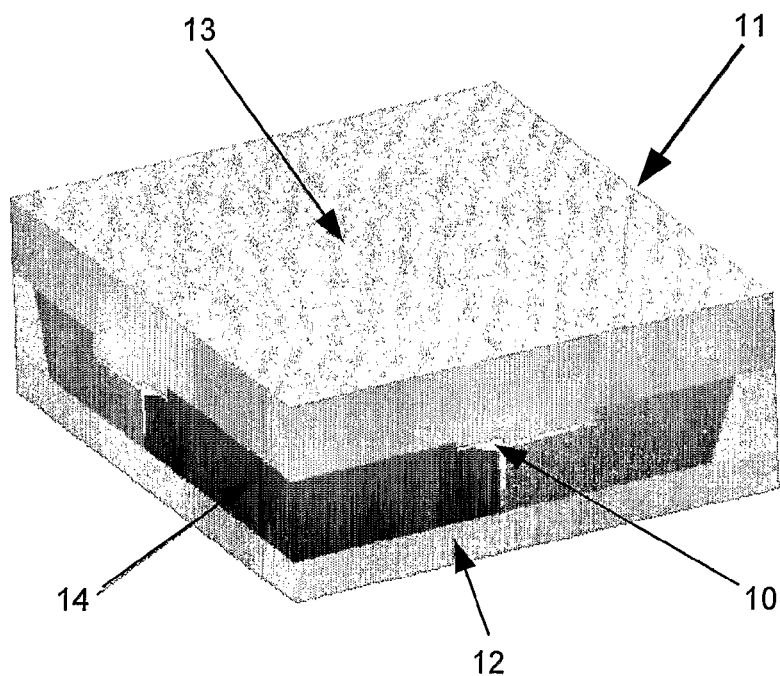
FIG. 4 shows the molding tool of FIG. 3 in a closed position.

The window frame 1 is manufactured by means of the so-called "resin-transfer-molding" or RTM technology. In this connection, first a mold part 10, the so-called preform, is made from fibers. This is next placed in a two-part molding tool 11, as shown in FIGS. 3 and 4. Within a lower molding tool 12 and an upper molding tool 13, an inner core 14 and an outer core 15, in this case formed in two parts, are arranged. The preform 10 is inserted between the two cores 14 and 15, the molding tool 11 is closed, and under pressure and temperature, resin is injected into the molding tool. The complete component 1 is subsequently hardened within the molding tool 11.

The preform 10 can therefore be made either as a complete part or in the so-called sub-preform technology, in which the complete window frame 1 is combined from individual sub-structure elements or sub-preforms. In each case, however, the preform 10 comprises individual layers, which in principle can be made from three different types:
- from a web semifinished part,
- from fiber bundles,
- from a combination of web semifinished parts and fiber bundles.

Figure 5:
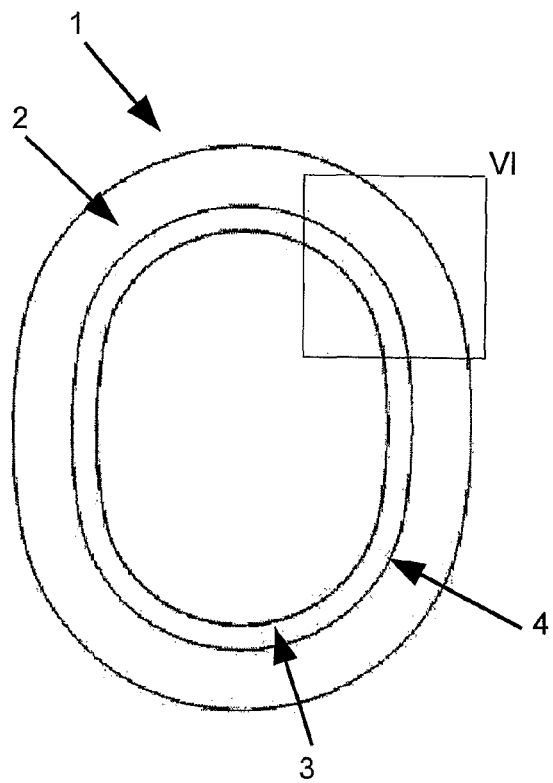
Figure 6:
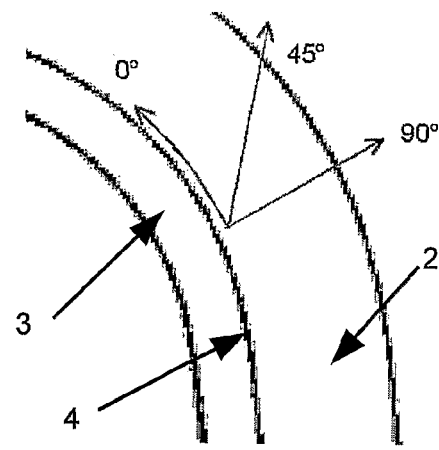

The direction of the individual fiber layers is critical for the weight savings achievable with the window frame 1 described here, which enable a load-suitable layer structure. A fiber direction, which is not circumferential in the frame, could not achieve the weight savings that are achieved with the arrangement described herein. The principle layer direction with the main directions 0°, 45°, and 90° are shown in FIGS. 5 and 6. The 0° direction therefore represents the circumferential direction of the window frame 1, the 90° direction runs in the radial direction, and the 45° direction runs in the region of the transition from the vertical flange 4 to the outer flange 2.

Figure 7:
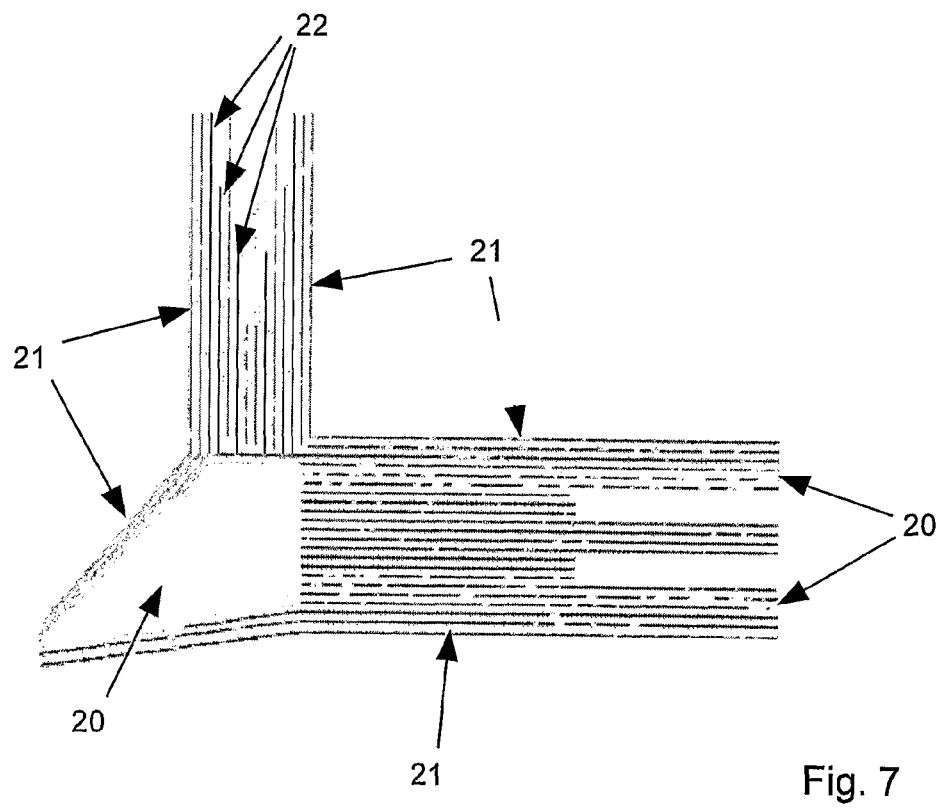
Fig. 7 shows the structure of a first preform in a sectional view.

FIG. 7 shows a section through the layer structure of the window frame 1 comprising the web semifinished parts. In this figure, reference numeral 20 designates the 0° winding core in the inner flange, reference numeral 21 designates the ±60° layers in all outer regions as well as the ±60° layers extending from the outer flange 2 to the inner flange 3, and reference numeral 22 designates the 0° and 90° layers in the region of the vertical flange 4. These layer directions are measured on the interface of the outer flange 2, inner flange 3, and vertical flange 4. Outside of this region, the following facts are provided for the curvilinear placed web semifinished parts:

Vertical Flange 4:
All fibers remain in the direction, in which they were measured; Inner flange 3 and outer flange 2:
0° fibers remain in the direction, in which they were measured;
±45° fibers remain in the direction, in which they were measured, but are curved;
±60° fibers remain in the direction, in which they were measured, but are curved.

Figure 8:
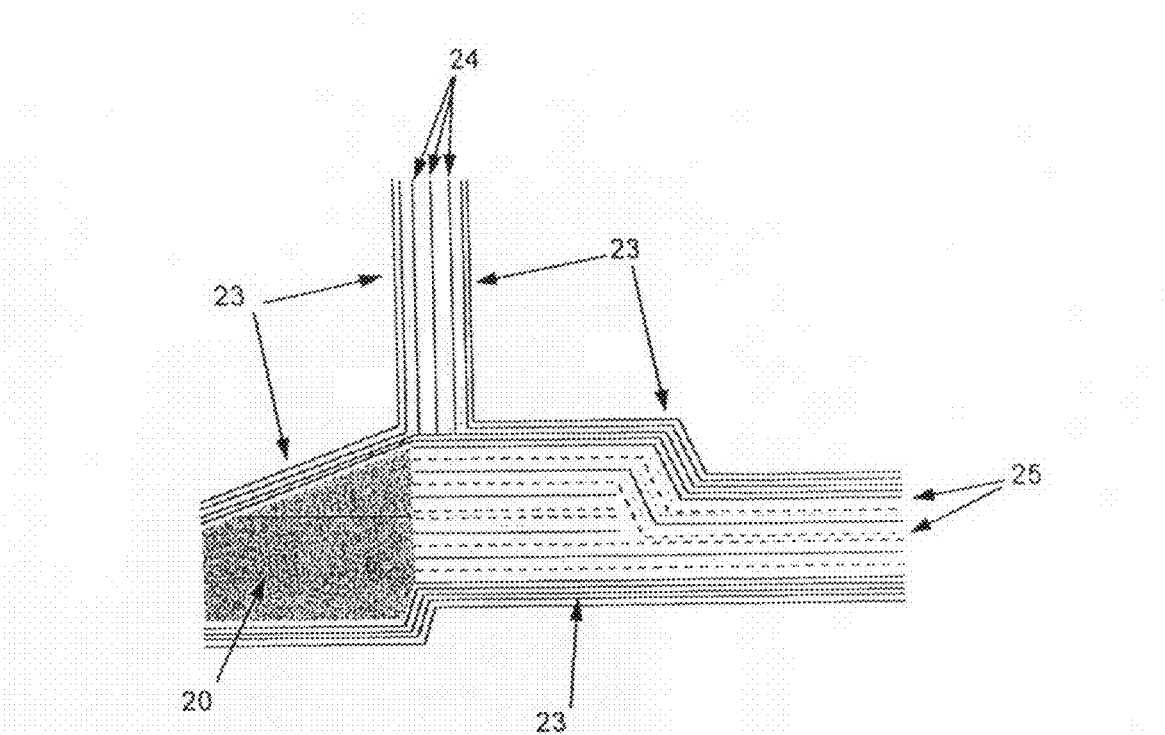
FIG. 8 shows the structure of a second preform in a sectional view.

FIG. 8 shows a load-suitable layer structure with fiber bundles, wherein, again, a section through the layer structure of the fiber bundle is shown. In this figure, reference numeral 20 designates the 0° winding core in the inner flange, reference numeral 23 designates the fiber bundle with a ±60° layer in all outer regions, as well as the ±60° layer extending from the outer flange 2 to the inner flange 3, reference numeral 24 designates the fiber bundle with 0° and 90° layers in the region of the vertical flange 4, and reference numeral 25 represents the fiber bundle with ±45° layers in the region of the outer flange 2. These layer directions are measured on the interface of the outer flange 2, inner flange 3, and vertical flange 4. In order to achieve a fiber progression, in which the fibers follow the load direction, a structure is selected for the window frame 1, which is summarized as follows:

Outer Flange 2:
Quasi-isotropic, radial structure in the region of the riveting;
Vertical Flange 4:
0° core for receiving the primary load;
±60° layers on the outer sides.
Inner Flange 3:
0° direction predominantly;
±60° layers on the outer sides;
90° for reinforcement.

In this manner, the following details are provided for the respectively placed fiber:
Vertical Flange 4:
All fibers remain in the direction, in which they were measured.
Inner Flange 3 and outer Flange 2:
0° fibers remain in the directions in which they were measured;
±45° fibers change their angle to ±60°;
±60° fibers change their angle to ±70°.

Figure 9:
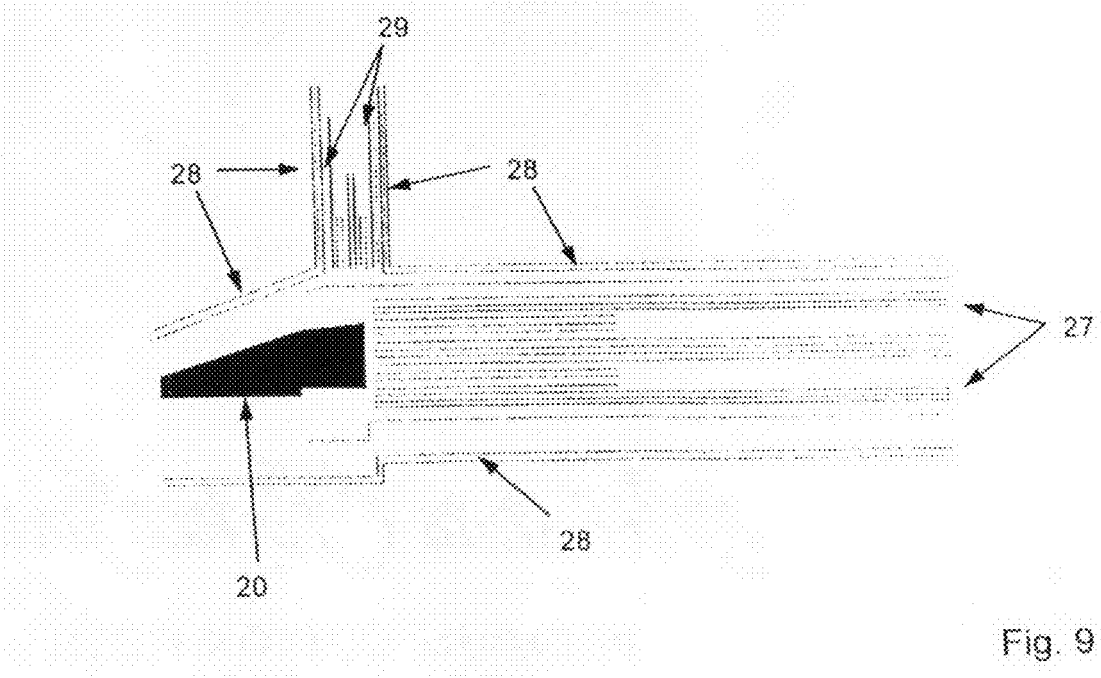
Fig. 9 shows the structure of a third preform in a sectional view.

Finally, FIG. 9 shows a layer structure with a combination of webbing and fiber bundles. Here, again reference numeral 20 designates the web layer of 0° winding core in the inner flange, while reference numeral 27 designates the 0° coiled push, 28 designates the ±60° web layer, and 29 designates the 0°/90° web layers.

The window frame 1 made in this manner has an approximately 50 percent weight savings with approximately the same manufacturing costs compared to the common aluminum window frames. Its tolerances are essentially lower than the tolerances of the corresponding aluminum components. Simultaneously, the frame offers higher safety and better thermal insulation than the common aluminum window frame.

The invention claimed is:

1. A window frame for installation in the exterior shell of an aircraft, comprising:
at least one outer flange having a varying thickness in different radial regions;
at least one inner flange;
at least one vertical flange arranged generally perpendicular to and between the at least one outer flange and the at least one inner flange;
wherein the at least one outer flange is attachable to the aircraft structure;
wherein on the at least one inner flange, a window element to be held is attachable, which is held via the at least one vertical flange;
wherein at least one of the at least one outer flange, at least one inner flange, and at least one vertical flange comprises a fiber-reinforced resin and is manufactured from a semi-finished part, which comprises a combination of fiber bundles and web layers; and
wherein the at least one vertical flange comprises 0° /90° web layers, the at least one outer flange comprises 0° web layers and the at least one inner flange comprises a web layer of 0° winding core; wherein the at least one vertical flange has a first outer end region, a second outer end region, and a central region positioned and extending between the first and second outer end regions, the central region including only the 0° /90° web layers.

2. The window frame for installation in the exterior shell of an aircraft of claim 1, wherein the web layers comprise +/−60° web layers, wherein the ±60° layers are arranged in all outer regions of the outer flange, the inner flange and the vertical flange; and
wherein the ±60° layers extend from the outer flange to the inner flange.

3. The window frame according to claim 1, wherein the first and second outer end regions of the at least one vertical flange include only ±60° web layers.

* * * * *